(12) United States Patent
Roeper (10) Patent No.: US 9,631,677 B2
(45) Date of Patent: Apr. 25, 2017

(54) CLUTCH

(71) Applicant: FORD GLOBAL TECHNOLOGIES, LLC, Dearborn, MI (US)

(72) Inventor: Hartmut Roeper, Monheim (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 87 days.

(21) Appl. No.: 14/036,362

(22) Filed: Sep. 25, 2013

(65) Prior Publication Data
US 2014/0083813 A1 Mar. 27, 2014

(30) Foreign Application Priority Data
Sep. 27, 2012 (DE) .................. 10 2012 217 508

(51) Int. Cl.
*F16D 13/42* (2006.01)
*F16D 13/48* (2006.01)
*F16D 13/75* (2006.01)

(52) U.S. Cl.
CPC ............. *F16D 13/42* (2013.01); *F16D 13/48* (2013.01); *F16D 13/757* (2013.01)

(58) Field of Classification Search
CPC ......... F16D 13/42; F16D 13/48; F16D 13/757
USPC .................. 192/70.19, 70.252, 111.16, 111.4
See application file for complete search history.

(56) References Cited

FOREIGN PATENT DOCUMENTS

EP 1801441 * 6/2007

* cited by examiner

Primary Examiner — Colby M Hansen
(74) Attorney, Agent, or Firm — James Dottavio; MacMillan, Sobanski & Todd, LLC (57) ABSTRACT

A clutch includes a first clutch part connected to a drive shaft, a second clutch part connected to an output shaft and a pressure element arranged to engage the first and second clutch parts, wherein a reinforcement mechanism is provided in a force flow zone between the pressure element and the second clutch part, wherein the mechanism has first and second ramps to transmit a biasing force for pressing the pressure element against the first clutch part.

22 Claims, 5 Drawing Sheets

CLUTCH

BACKGROUND OF THE INVENTION

1. Field of the Invention

This invention relates generally to a clutch wherein a reinforcement mechanism is provided in a force flow zone between a pressure element and a second clutch part, which mechanism has ramps to transmit a biasing force for pressing the pressure element against the second clutch part.

2. Description of the Prior Art

Such clutches with reinforcement mechanisms are described in EP 1 882 862 A2 and EP 1 801 441 B1. The reinforcement mechanisms have ramps that can here be described as force transmission surfaces. The ramps are arranged at an angle of greater than zero to the drive shaft and at which a circumferential force is partly deflected into a biasing force. A problem with such clutches is that on a load change, i.e. on a change from an acceleration of the output shaft to a braking of the output shaft, metallic knocking noises known as clonking noises can occur due to the mutual impacts of the ramps. As well as the noise nuisance, this leads to increased wear on the clutch. The pressure element and the second clutch part usually each have a flat friction surface for their mutual friction connection, so the pressure element is also often called a pressure plate and the second clutch part a friction disc.

SUMMARY OF THE INVENTION

A clutch includes a first clutch part connected to a drive shaft, a second clutch part connected to an output shaft and a pressure element arranged between the clutch parts, wherein a reinforcement mechanism is provided in a force flow zone between the pressure element and the second clutch part, which mechanism has ramps to transmit a biasing force for pressing the pressure element against the first clutch part.

To avoid clonking noises on load change, the ramps are arranged lying tight against each other. A generic clutch is provided in which the clonking noises from the mutual impact of the ramps can be avoided.

The ramps are arranged guided tightly against each other. The ramps lie against each other without interruption. This tight contact between the ramps means that in all operating states of the clutch, the ramps do not separate from each other but remain arranged lying against each other. Thus on correct operation of the clutch, there is no separation of the ramps from each other, so that on a load change in which the direction of the torque to be transmitted to the clutch changes, the ramps can no longer impact on each other, causing the clonking noise.

This permanent contact between the ramps can be achieved by a form fit between the components constituting the ramps. For this, for example, the ramps can be arranged on claw-like components which are arranged to intermesh with each other by form fit such that the ramps are arranged lying against each other. To achieve this tight contact of the ramps in practice however, constructionally complex, tight form tolerances are required.

Structurally, it is simpler to provide a force-fit connection, as tight as possible, of the ramps. This can be achieved under the action of a force with a force component perpendicular to the ramps. For this, it can be provided that the mutually associated ramps are held lying against each other by a magnetic force or an electromagnetic force. For this, at least one of the ramps lying against each other can be formed as a permanent magnet, for example magnetized or made from magnetic material.

Advantageously, a measure acting purely mechanically, in a manner which is structurally simple and reliable for example on vibrations of the clutch, can be provided for axial pressurization of the ramps. In a structurally simple manner, the ramps can lie against each other under spring pretension.

To transmit the biasing force, the ramps can each have a surface normal with an axial direction component which is parallel to the shaft and a circumferential direction component which is circumferentially around the shaft. Thus the amount of the self-reinforcement or the biasing force can be set by adjustment of the ramps, i.e., via the size of the axial direction component of the surface normals of the ramp or the force transmission surfaces. Preferably, a ramp angle between the axial direction of the surface normals of the respective ramps or force transmission surfaces is more than 45°, preferably more than 60°, or is around 70°. On torque transmission, a normal force, the axial direction component of which is the servo force, can be applied in a direction normal to the surface of the ramps. The greater this ramp angle, the higher the proportion of the axial force component of the normal force, i.e. the greater the servo force.

The ramps can form first and second ramp pairs, in each of which a first ramp and a second ramp cooperate—i.e., the first and second ramps are pressed together under force, that is force fit together. The circumferential direction component of the ramps of the first ramp pair can point in a first circumferential direction and the circumferential direction component of the ramps of the second ramp pair can point in a second circumferential direction opposite the first circumferential direction. Thus, the ramps of first ramp pair can be set in the opposite direction to the ramps of the second ramp pair. Thus, the circumferential direction component of the ramps of the first ramp pair can point clockwise and the circumferential direction component of the ramps of the second ramp pair can point counter-clockwise.

On clutch engagement, i.e., when the two clutch parts begin to rub against each other, torque is transmitted because of the rotation speed differences of the shafts relative to each other. Via the ramps of the first ramp pair, which are lying against each other and have a circumferential direction component pointing in a first circumferential direction, torques acting in the first circumferential direction can be transmitted. Similarly, via the ramps of the second ramp pair, which are lying against each other and have a circumferential direction component pointing in the second circumferential direction, torques acting in the second circumferential direction can be transmitted. Thus, torques can be transmitted in both circumferential directions via the first and second ramp pairs. Since the ramps of both ramp pairs lie tightly against each other, on a load change, i.e. on a change of circumferential direction, there is no mutual impacting of the ramps of the ramp pairs, which are subjected to the torque during and after the change.

In a manner favorable for force mechanics, the ramp pairs can be distributed circumferentially in relation to the shafts, in particular at equal circumferential distances, and arranged on the same circumferential circle. Preferably the first ramp pairs and the second ramp pairs are arranged in a mutually alternating sequence circumferentially.

In a structurally simple manner it can be provided that the reinforcement mechanism has a ramp piece pair comprising first and second ramp pieces, the first ramp piece having first ramps, and the second ramp piece having second ramps.

Here the ramp pieces in relation to the shafts can lie against each other axially on the faces via mutually associated ramps. The ramp pieces can lie against each other exclusively via mutually associated ramps. For torque transmission, the first ramp piece can be mounted torque-resistantly on the first clutch part and the second ramp piece can be mounted torque-resistantly on the pressure element. Since the two clutch parts, and hence the pressure element are moved axially relative to each other on release or engagement of the clutch, for example corresponding to the first axial relative movement of the clutch parts, the first ramp piece can be mounted axially movably on the first clutch part and/or the second ramp piece can be mounted axially movably on the pressure element. However, as will be explained in more detail below, the latter is less favorable because of the jerking of the pressure element away from the second clutch part on release of the clutch.

At least one ramp of the ramp pair, or one ramp piece of the ramp piece pair, can lie under spring pretension on the associated ramp or on the other ramp piece. The first ramp piece can be arranged to press against the second ramp piece by means of a first spring acting in a pressure application direction away from the first ramp piece towards the second ramp piece, and/or the second ramp piece can be arranged to press against the first ramp piece by means of a second spring acting against the pressure application direction. Thus, the two springs can act on the ramp pieces in mutually opposing directions.

To release the pressure disc from the second clutch part, tangential leaf springs can be provided, for example, as in a conventional clutch. Such a clutch can comprise a drive-side clutch component such as a flywheel or clutch basket as a first clutch part, and a clutch cover attached to the clutch component and cranked axially away, wherein the output-side second clutch part, such as the friction disc, and the pressure element such as the pressure plate, are arranged axially between the clutch component and clutch cover. In such a clutch, the tangential leaf springs rest with the effect of spring force between the pressure disc and the clutch cover. The pressure plate can be pressed mechanically against the second clutch element via a so-called plate spring in the pressure application direction, wherein the plate spring is formed substantially stronger than the tangential springs. On release of the plate spring from the pressure disc on clutch release, the pressure plate is pressed away from the second clutch part via the tangential springs and in a direction opposite, or against, the pressure application direction, in order thus to prevent slippage between the pressure plate and the first clutch part which would increase the wear and extend the coupling process. Thus, an undesirable drag moment acting on the gearbox input shaft is avoided. Thus, the second spring can exert a force against the pressure application direction on the second ramp piece, and hence on the ramps lying against each other, and, at the same time, on the pressure plate in order to release the pressure plate from the second clutch part.

In a preferred embodiment of the clutch according to the invention, it is provided that the second spring performs this function of the tangential springs conventionally used in the prior art. Consequently, on opening of the clutch, i.e. on release of the pressure element from the second clutch part, the second spring can exert a force on the pressure element against the pressure application direction, in order to release the pressure element from the second clutch part in an accelerated manner. The second ramp piece can lie on the pressure element at the back in the pressure application direction. When the clutch is in a closed position, the pressure element lies on the plate springs at the back in the pressure application direction. The second spring can itself rest on the pressure element at the front in the pressure application direction and on the clutch component at the back in the pressure application direction.

The first ramp piece and/or the second ramp piece can each have a head portion with the respective associated ramps on the face, wherein the ramp pieces are arranged lying against each other on their faces via the ramps. The first ramp piece and/or the second ramp piece can each have a head portion and a foot portion, wherein the foot portion is arranged in a first guide channel on the first clutch part or in a second guide channel on the pressure element. The foot portion can connect directly to the head portion. In a structurally simple manner, the first spring can be arranged guided on the outside on the foot portion of the first ramp piece and/or the second spring can be arranged guided on the outside on the foot portion of the second ramp piece. The springs can have a spring axis, in the direction of which they act as springs. In a manner favorable for force mechanics, the spring axes of the springs, in the installation position thereof, can lie at least approximately on a common line. Also, in a manner favorable for force mechanics, the ramp pieces can have a common longitudinal axis in the installation position. The longitudinal axes of the ramp pieces and the spring axes of the springs can coincide in the installation position. The ramp pieces can each be formed integrally. Furthermore, in relation to their longitudinal axis they can have two middle longitudinal sections arranged vertically to each other as mirror-symmetrical planes, wherein one of the mirror-symmetrical planes is arranged perpendicular to the pressure application direction in the installation position.

The foot portion of the first ramp piece and/or the foot portion of the second ramp piece can be axially movable in the first guide channel and/or in the second guide channel respectively. Despite the contact between the ramps or ramp parts, a movement of the pressure element relative to the clutch parts can take place in that at least one of the clutch parts is guided in an axially moveable manner.

The spring constant of the second spring can have a value which amounts to a multiple of the value of the spring constant of the first spring. This is structurally favorable since the two springs act opposite each other on the ramps, and have the same spring travel distance on axial movement of the ramps. The first spring can rest on the first clutch element at the front and on the first ramp piece at the back. If the first ramp piece is guided in an axially movable manner on the first clutch element, on the axial movement of the ramp pieces described above, the first spring is compressed against the pressure application direction to open the clutch. In this case the second spring "works" against the first spring and can consequently and advantageously, at least to support the movement of the pressure element against the pressure application direction, have a correspondingly higher spring force than the first spring for the same spring travel. The value of the spring constant of the second spring can be five times higher, preferably fifteen times higher, and ideally twenty times higher than the value of the spring constant of the first spring. The higher the spring constant of the second spring in relation to the spring constant of the first spring, the more quickly the pressure element can be separated from the second clutch part, and the slip which would otherwise occur can be avoided. On the occurrence of slip, a tilt moment (described below) and the biasing force can be transmitted at the ramps, which would counter a separation of the pressure plate from the second clutch element. The spring constant of the first spring must merely be so high that the ramps or ramp pieces can be reliably held against each other by the first spring when the clutch is in the open position, and so low that it does not have a disadvantageous effect on separation of the clutch element from the second clutch part on opening of the clutch.

In a preferred refinement of the clutch, the cross section of the foot portion of the first ramp piece and/or the cross section of the foot portion of the second ramp piece can have a smaller dimension than the cross section of the first guide channel and/or the cross section of the second guide channel respectively. Since, as in a preferred embodiment of the clutch described above, the ramps are arranged in the head portion of the respective ramp piece and its foot portion can be guided axially in the allocated guide channel, on transmission of a torque to the ramps a tilt moment can occur in relation to the foot portion, by means of which the foot portion can tilt into a tilt position on the inside in the guide channel and seize axially. Thus the biasing force transmitted at the ramps by the torque can act on the pressure element in the pressure direction. As a result, the clutch force applied externally can be reduced accordingly and/or the necessary clutch engagement time shortened. Advantageously, the smaller dimension and/or the surface areas of the foot portion and guide channel can be designed by construction or material such that they are suitable for self-inhibition of the axial displaceability of the respective foot portion by tilting it in the guide channel. In material terms, it is advantageous if at least the regions in which the foot portion and guide channel can lie against each other by friction fit in the tilt position, in this pairing have as high a coefficient of friction as possible in order to achieve the maximum degree of self-inhibition.

For improved self-inhibition of the first ramp piece, it can be provided that the foot portion, in the region in which it is guided in the first guide channel, has outwardly pointing protrusions which are spaced axially by a set amount and on which the first ramp piece rests in the tilt position. In particular the protrusions are arranged on the outsides of the foot portion pointing in the circumferential direction. Two protrusions running in the cross section plane of the foot portion or vertically to the pressure application direction can be provided. These can be arranged and spaced from each other by a set amount. Via these protrusions, the foot portion of the respective ramp piece, on torque transmission, can lie axially friction-resistantly on the inside in the guide channel in a locally defined manner. The smaller the axial spacing of the two protrusions from each other, the greater the self-inhibition force transmitted by the resulting tilt moment can be.

In a mechanically favorable manner, at least one of the ramp pieces can be arranged twist-resistantly in the associated guide channel. In a manner favorable for spring mechanics, at least one of the springs can be arranged twist-resistantly on the associated ramp piece, in particular on the foot portion of the associated ramp segment. For this, the foot portion and spring can have a rectangular cross section.

To transmit a biasing force which is equal over the circumference, and for tilt-safe separation of the pressure disc from the second clutch element, the reinforcement mechanism can have a series of ramp piece pairs which, in relation to the shafts, are arranged radially on a circumferential circle and evenly spaced from each other circumferentially. Preferably the ramp piece pairs are formed identically.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
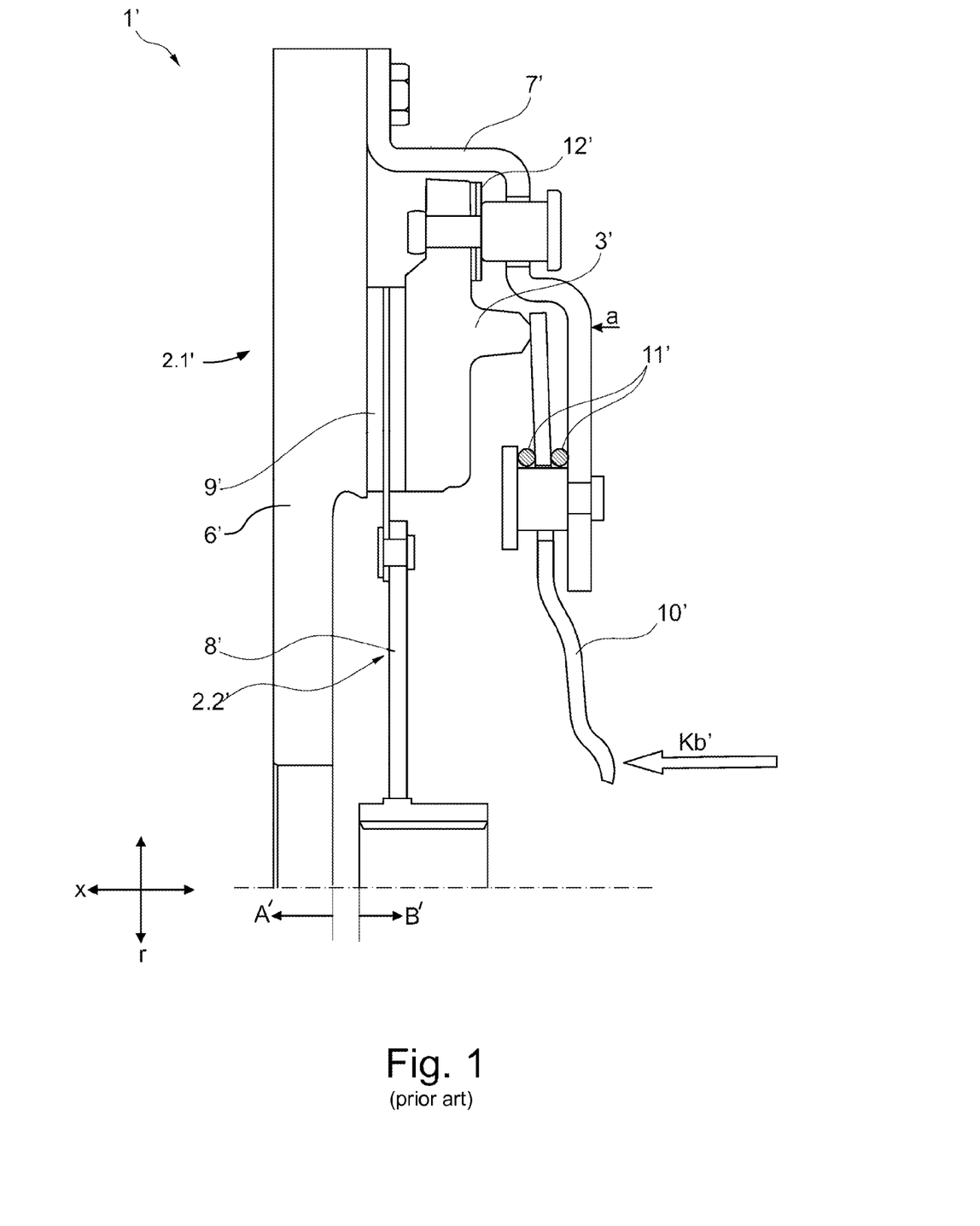
FIG. 1 is a schematic radial section of an upper half of a conventional clutch.
Figure 2:
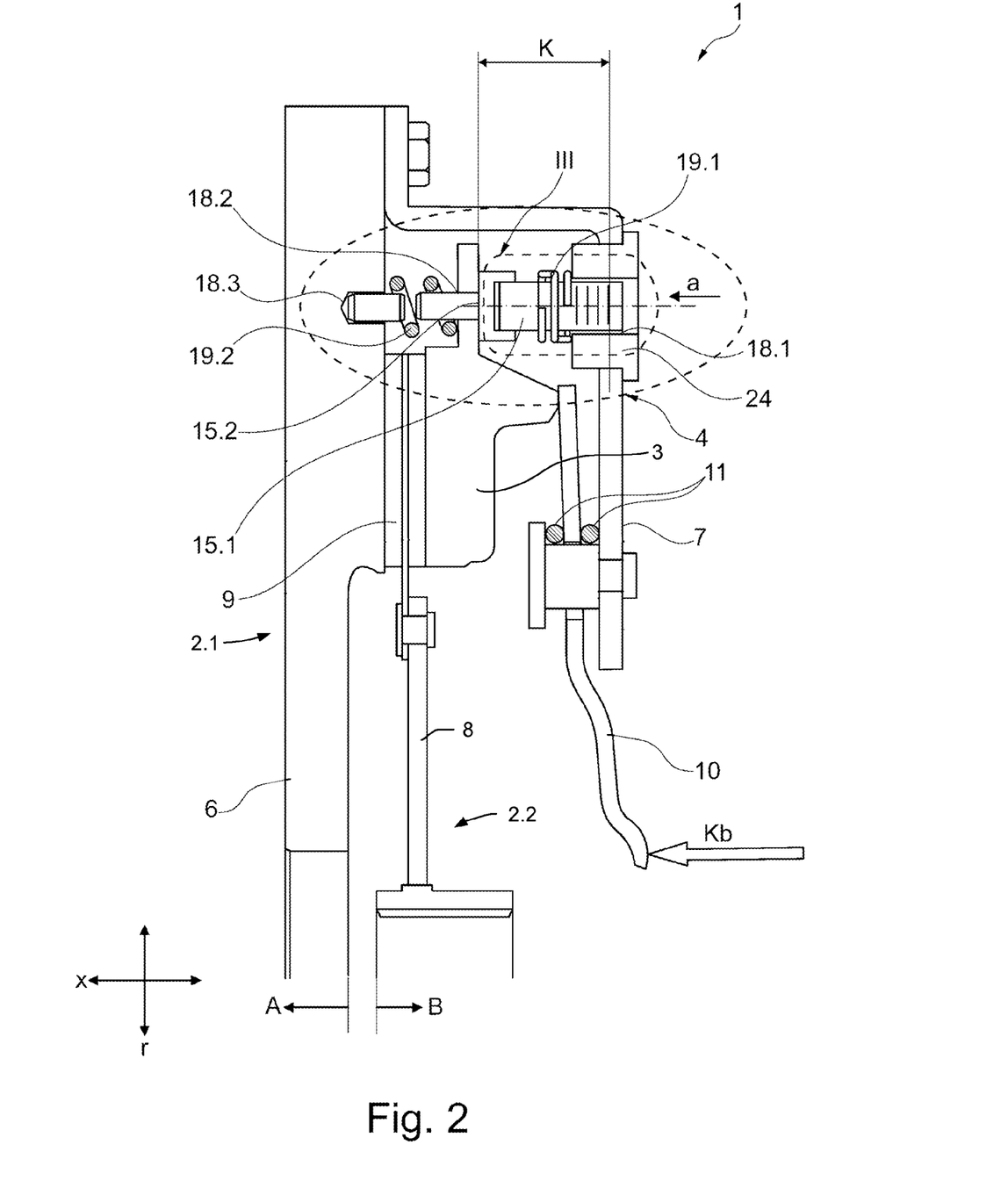
FIG. 2 is a schematic radial section of an upper half of a clutch according to the invention with reinforcement mechanism.
Figure 2A:
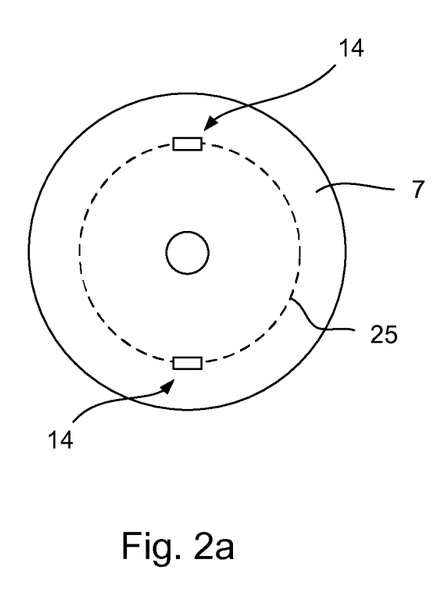
FIG. 2a is a schematic end view of the clutch of FIG. 2.

FIGS. 2 to 5 illustrates a clutch, indicated generally at 1, various views and extracts. FIG. 1 illustrates a prior art clutch, indicated generally at 1', the reference numerals of which carry an apostrophe to distinguish them from the clutch 1 shown in FIGS. 2 to 5.

Referring now to FIG. 1, the prior art clutch 1' has a first clutch part, indicated generally at 2.1', connected to a drive shaft A', a second clutch part, indicated generally at 2.2', connected to an output shaft B', and a pressure element formed as a pressure plate 3'.

The first clutch part 2.1' has a flywheel 6' and a clutch cover 7'. The clutch cover 7' is firmly connected to the flywheel 6' and cranked away therefrom against a pressure application direction a. The second clutch part 2.2' is formed as a friction disc 8' with friction linings 9' on both sides of the friction disc 8'. The pressure plate 3' and friction disc 8' are arranged between the clutch cover 7' and the flywheel 6'. When the clutch 1' is closed (FIG. 1), the friction disc 8' is pressed tightly against the flywheel 6' by the pressure plate 3'. For this a suitable plate spring 10' is provided which exerts a contact pressure force T on the pressure plate 3'. In the closed state, the full engine torque is transmitted via the prior art clutch 1'. The plate spring 10' is mounted on wire rings 11' that may be tilted between two positions, a closed position (FIG. 1) and an open position (not shown). On activation of the prior art clutch 1', a clutch activation force Kb' is applied to the plate spring 10', whereby the radial tabs of the plate spring 10' on the wire rings 11' tilt out of the closed position into an open position (not shown here), in which the tabs are separated from the pressure plate 3'. The tabs are separated from the pressure plate 3' against the pressure application direction a. Thus the friction disc 8' is also separated from the pressure plate 3' and flywheel 6'. As a result, no engine torque is transmitted via the clutch 1' in the open position. To avoid an unfavorable drag moment on the clutch 1', the tangential leaf springs 12' lift the pressure plate 3' away from the friction plate 8' when the clutch is opened.

Referring now to FIGS. 2 to 5, there is illustrated a clutch 1 in accordance with the present invention and having a first clutch part, indicated generally at 2.1, connected to a drive shaft A, a second clutch part, indicated generally at 2.2, connected to an output shaft B, and a pressure element formed as a pressure plate 3 to engage the first and second clutch parts 2.1, 2.2. The clutch 1 according to the invention and illustrated in FIG. 2, to a great extent, has a similar structure to the prior art clutch 1' shown in FIG. 1. For the clutch 1, a reinforcement mechanism, indicated generally at 4, is provided in a force flow zone K between the first clutch part 2.1 and pressure plate 3. The mechanism 4 has first and second ramps 5.1, 5.2, respectively, to transmit a biasing force V for pressing the pressure plate 3 against the second clutch part 2.2 in a pressure application direction a.

The embodiment shown here of the clutch 1 according to the invention has a structure similar to the prior art clutch 1' shown in FIG. 1. In particular, the first clutch part 2.1 has a flywheel 6 and a clutch cover 7. The clutch cover 7 is firmly connected to the flywheel 6 and cranked away therefrom against the pressure application direction a. The second clutch part 2.2 is formed as a friction disc 8 with friction linings 9 on both sides of the friction disc 8. The pressure plate 3 and friction disc 8 are arranged between the clutch cover 7 and the flywheel 6. When the clutch 1 is closed (FIG. 2), the friction disc 8 is pressed tightly against the flywheel 6 by the pressure plate 3. For this a suitable plate spring 10 is provided which exerts a contact pressure force T on the pressure plate 3. In the closed state, the full engine torque is transmitted via the clutch 1. The plate spring 10 is mounted on wire rings 11 and may be tilted between two positions, a closed position (FIG. 2) and an open position (not shown). On activation of the clutch 1, a clutch activation force Kb is applied to the plate spring 10, whereby the radial tabs of the plate spring 10 on the wire rings 11 tilt out of the closed position into an open position (not shown here), in which the tabs are separated from the pressure plate 3. The tabs are separated from the pressure plate 3 against the pressure application direction a. Thus the friction disc 8 is also separated from the pressure plate 3 and flywheel 6. As a result, no engine torque is transmitted via the clutch 1 in the open position. To avoid an unfavorable drag moment on the clutch 1, the second spring 19.2 lifts the pressure plate 3 away from the friction plate 8 when the clutch is opened.

Figure 4A:
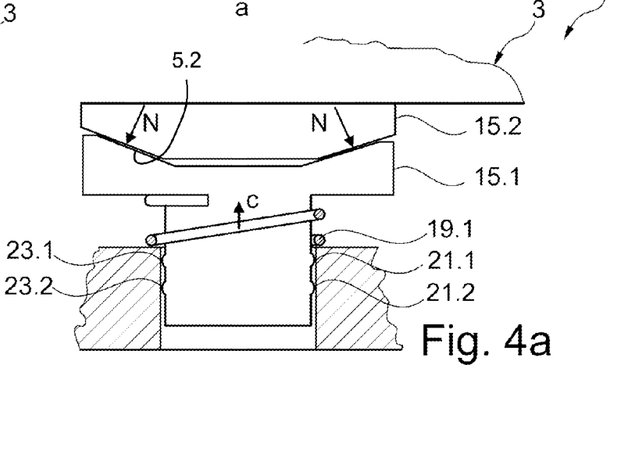
FIGS. 4a and 4b are an extract enlargement III slightly enlarged in comparison with FIG. 3a, showing the force conditions when the clutch is open without torque transmission.
Figure 4B:
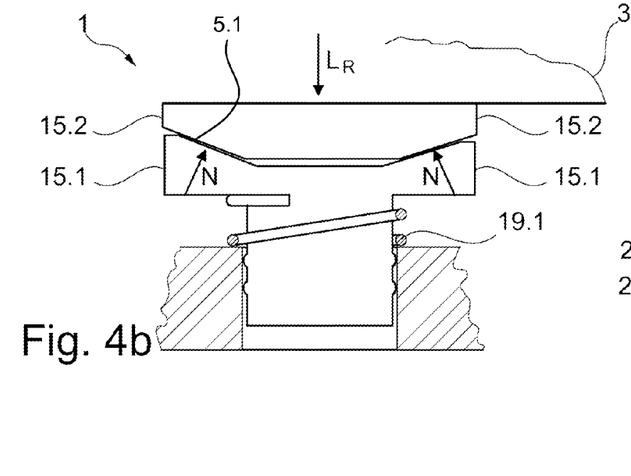
Figure 5A:
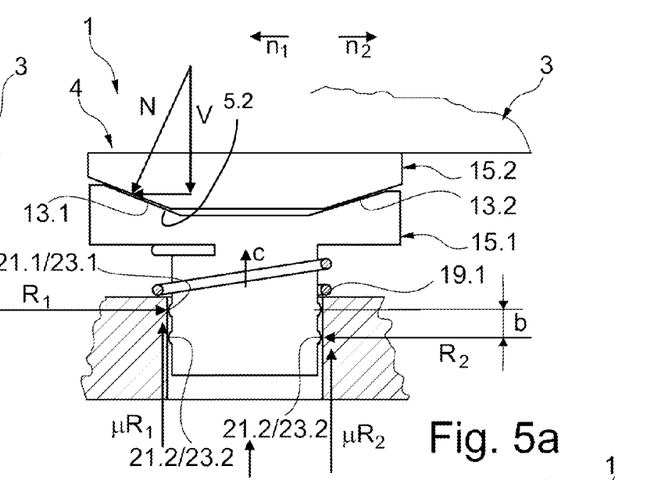
FIGS. 5a and 5b are an extract enlargement III slightly enlarged in comparison with FIG. 3a, showing the force conditions on torque transmission.

The first and second ramps 5.1, 5.2, respectively, are arranged tightly lying against each other. The first and second ramps 5.1, 5.2, respectively, are arranged lying against each other in all operating states of the clutch 1. In the embodiment of the clutch 1 shown here, the first and second ramps 5.1, 5.2 always lie against each other by an applied force, i.e., force fit. This is particularly clear from FIGS. 4 and 5. These show the force conditions at the ramps 5.1, 5.2 on torque transmission (FIG. 5) and when the clutch 1 is open (FIG. 4), i.e. without torque transmission at the clutch 1, which will be described in more detail below. In particular FIGS. 4a and 5a depict the forces which act on the second ramp 5.2, and FIGS. 4b and 5b the forces which act on the first ramp 5.1 and on the pressure plate 3. The torque transmission begins as soon as the friction partners—first and second clutch parts 2.1, 2.2, respectively, and pressure plate 3—begin to touch and rub against each other.

Figure 3A:
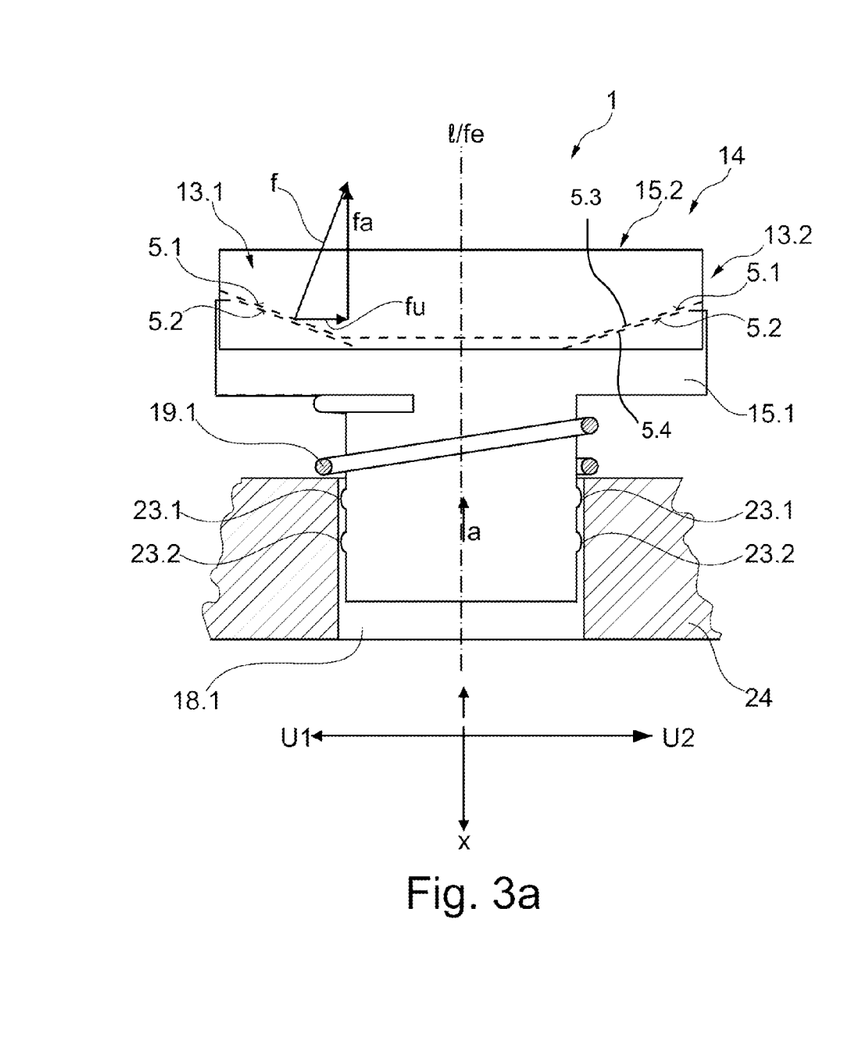
FIG. 3a is an extract enlargement III according to FIG. 2.

The first and second ramps 5.1, 5.2, respectively, each have a surface normal force f comprising an axial direction component $f_a$ which is parallel to the shafts A, B, and a direction component $f_u$ which is circumferential to the shafts A, B (FIG. 3a). The first and second ramps 5.1, 5.2, respectively, cooperate in pairs in the form of first ramp pairs 13.1 and second ramp pairs 13.2. A first ramp 5.1 and a second ramp 5.2 are arranged in each first and second ramp pair 13.1, 13.2, respectively, wherein the circumferential direction component $f_u$ of the first and second ramps 5.1, 5.2 of the first ramp pair 13.1 points in a first circumferential direction u1 and the circumferential direction component $f_u$ of the ramps 5.1, 5.2 of the second ramp pair 13.2 point in a second circumferential direction u2 opposite the first circumferential direction u1.

Figure 5B:
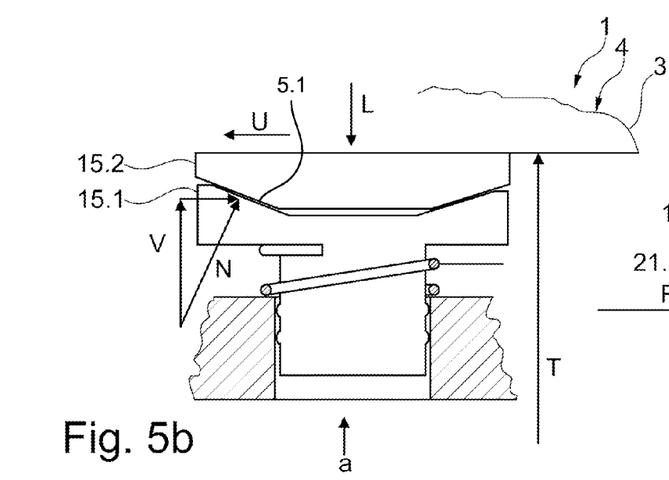

When clutch 1 transmits a torque with the resulting circumferential force U to the reinforcement mechanism, a normal force N is built up between the first and second ramps 5.1, 5.2, respectively. (FIG. 5). The axial component of the normal force N is the servo force V, which supports the plate spring 10 pressing the pressure plate 3. This torque or its associated circumferential force can be directed in the first circumferential direction u1 or the second circumferential direction u2, or clockwise and counter-clockwise, respectively. In both cases, the normal force N with its axial direction component, the servo force V, is built up at the first and second ramps 5.1, 5.2, respectively.

The reinforcement mechanism 4 has a series of ramp piece pairs, indicated generally at 14, which in relation to shafts A, B, are arranged equally spaced about the circumference and on a circumferential circle 25 (FIG. 2a) about the shafts A, B. The ramp piece pairs 14 in the circumferential circle 25 each have a first ramp piece 15.1 with second and fourth ramps 5.2, 5.4, respectively, and a second ramp piece 15.2 with first and third ramps 5.1, 5.3, respectively, wherein the first and second ramp pieces 15.1, 15.2, respectively, lie against each other on the face via the ramps 5.1, 5.2, 5.3, 5.4. Each ramp piece pair 14 has a first ramp pair 13.1 comprising the first and second ramps 5.1, 5.2, respectively, and a second ramp pair 13.2 comprising the third and fourth ramps 5.3, 5.4, respectively. The normal force N, and hence the servo force V as the axial force component of the normal force N, is built up as a reaction to a circumferential force U in the first circumferential direction u1 at the first ramp pair 13.1 (FIG. 4) and a circumferential force (not shown) in the second circumferential direction u2 at the second ramp pair 13.2. The third and fourth ramps 5.3, 5.4, respectively, are similar to the first and second ramps 5.1, 5.2. As such, discussion of the first and second ramps 5.1, 5.2, including structure and functionality, is also applicable to the third and fourth ramps 5.3, 5.4, respectively.

The first ramp piece 15.1 has a first head portion 16.1 and a first foot portion 17.1. The second ramp piece 15.2 has a second head portion 16.2 and a second foot portion 17.1. The first ramp piece 15.1 with its first foot portion 17.1 is mounted torque-resistantly and moveably in the axial direction a in a first guide channel 18.1 at the first clutch part 2.1. The second ramp piece 15.2 with its second foot portion 17.2 is mounted torque-resistantly in a second guide channel 18.2 on the pressure plate 3, wherein the second foot portion 17.2 protrudes through the pressure plate 3, and on its back side guides the second spring 19.1. On the flywheel side, this spring is guided by the pin 18.3. The second ramp piece 15.2 lies with its second head portion 16.2 on the pressure plate 3 at the front in the pressure application direction a from the first ramp piece 15.1 towards the second ramp piece 15.2.

The first and second ramp pieces 15.1, 15.2, respectively, lie tightly on each other under spring pretension. For this a first spring 19.1 associated with the first ramp piece 15.1 is provided, which rests on the first head portion 16.1 of the first ramp piece 15.1 and on the first clutch part 2.1, on the outer edge side of the first guide channel 18.1. This first spring 19.1 presses the first ramp piece 15.1 in the pressure application direction a against the second ramp piece 15.2. Also a second spring 19.2 is provided which rests between the pressure plate 3 and the flywheel 6 and lifts the pressure plate 3 away from the second clutch part 2.2 when the clutch is released. The first and second springs 19.1, 19.2, respectively, each have a spring axis fe, which lies on a line with the longitudinal axes L of the first and second ramp pieces 15.1, 15.2, respectively. The first and second springs 19.1, 19.2 and the first and second ramp pieces 15.1, 15.2, respectively, are formed mirror-symmetrically in relation to the drawing plane in FIG. 3a and FIG. 3b. The spring constant of the second spring 19.2 is around twenty times larger than the spring constant of the first spring 19.1. Both the first and second springs 19.1, 19.2, respectively, are coil springs, wherein the first spring 19.1 has a rectangular form around the first foot portion 17.1 of the first ramp piece 15.1 and the second spring 19.2 a circular form around the pin 18.3.

Figure 3B:
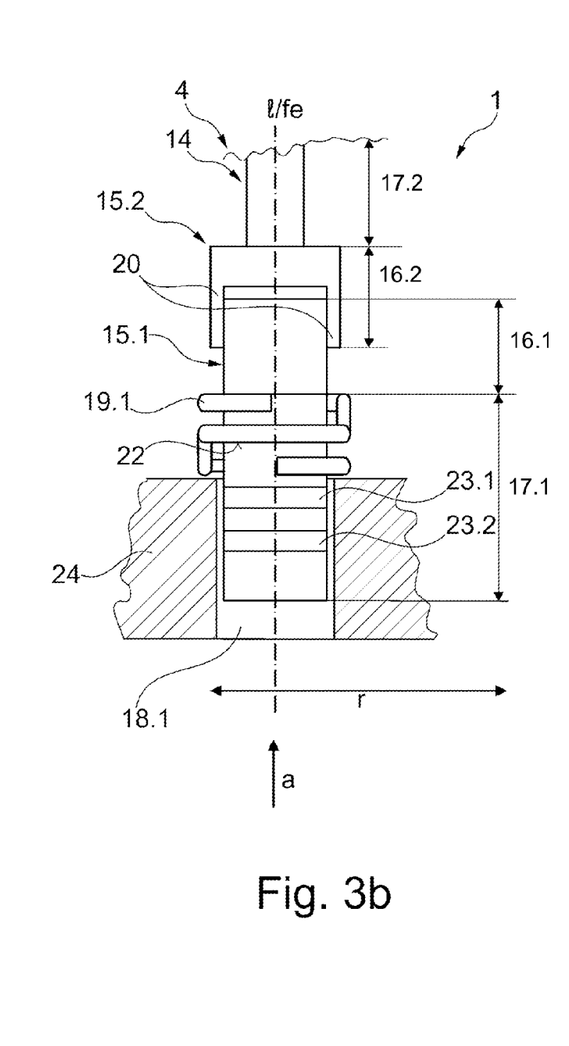
FIG. 3b is an extract enlargement III according to FIG. 3a rotated through 90°.

For the relative angular positioning of the first and second ramp pieces 15.1, 15.2, respectively, to each other, at the second head portion 16.2 of the second ramp piece 15.2, side guide cheeks 20 are provided which extend laterally over the first head portion 16.1 of the first ramp piece 15.1 (FIG. 3b). The first ramp piece 15.1 is arranged with its first foot portion 17.1 movably in the radial direction r in the first guide channel 18.1. Since the two ramp pieces 15.1, 15.2 are arranged between two components which are stationary in relation to each other, the flywheel 6 and the clutch cover 7, via the axial displaceability of the first ramp piece 15.1 in the first guide channel 18.1, the pressure plate 3 can move relative to the first clutch part 2.1. This relative movement takes place on lifting of the pressure plate 3 away from the second clutch part 2.2 against the pressure application direction a, wherein when the pressure plate 3 is lifted from the second clutch part 2.2, no torque is transmitted via the clutch 1. The second spring 19.2 presses the pressure plate 3 and hence the first and second ramp pairs 13.1, 13.2, respectively, against the pressure application direction a, and at the same time holds the first and second ramps 5.1, 5.2, respectively, pressed against each other. At the same time the first spring 19.1 presses, but with lower spring force than the second spring 19.2, against the second spring 19.2 in the pressure application direction a so that a tight mutual contact of the first and second ramps 5.1, 5.2, respectively, is guaranteed. Since the second spring 19.2 is partly pressure-relieved when the pressure plate 3 has lifted away, this only acts on the first and second ramps 5.1, 5.2, respectively, with the residual spring force $L_R$, with a small normal force N, as a contact reaction at the first and second ramps 5.1, 5.2, respectively, wherein the spring force G of the first spring 19.1 is in equilibrium with the residual spring force $L_R$ of the second spring 19.2 (FIG. 4).

FIG. 5 shows the force conditions at the first and second ramp pieces 15.1, 15.2, respectively, and the first guide channel 18.1 on transmission of a torque and hence of a circumferential force U, here shown in the first circumferential direction u1, wherein the clutch 1 is closed. Via the plate spring 10, a contact pressure force T is applied to the pressure plate 3, wherein the contact pressure force T of the pressure plate 10 is substantially larger than the spring force L of the second spring 19.2. A normal force N acts on the first and second ramps 5.1, 5.2, respectively, which force is here substantially larger in comparison with the normal force N in FIG. 4 when the clutch 1 is opened. When the clutch 1 is in the closed position, a circumferential force U from the second ramp piece 15.2 acts on the first ramp piece 15.1. This exerts a tilt moment on the first ramp piece 15.1, whereby the first ramp piece 15.1 is tilted in the first guide channel 18.1 and on the inside lies on the first guide channel 18.1 at first and second contact points 21.1, 21.2, respectively. The size of the tilt moment depends amongst others on the distance of the first and second ramps 5.1, 5.2, respectively, from the first and second contact points 21.1, 21.2, respectively, in which the first foot portion 17.1 lies on the inside in the first guide channel 18.1.

To tilt the first ramp piece 15.1 in the first guide channel 18.1, the first foot portion 17.1 has a smaller dimension than the guide channel 18.1. This is a minimal size difference and therefore difficult to see on the drawing. If the tilt moment exerted is high enough, a seizing or self-inhibition of the first ramp piece 15.1 in the first guide channel 18.1 occurs and thus acts as an abutment, allowing the servo force V acting on the first and second ramps 5.1, 5.2, respectively, to increase and act in the pressure application direction a.

As evident from FIGS. 3a and 3b, the first foot portion 17.1 and the first guide channel 18.1, like the first spring 19.1, have a rectangular cross section with two short sides 22, whereby the first foot portion 17.1 in the first guide channel 18.1 and the first spring 19.1 on the first foot portion 17.1 are guided twist-resistantly.

To create first and second defined contact points 21.1, 21.2, respectively, and minimize the possible wear due to the tilt process for self-inhibition against axial displaceability, two rear and two front protrusions 23.1, 23.2, respectively, with rounded profile are provided at the same height on the two short sides 22 of the first foot portion 17.1. The rear and front protrusions 23.1, 23.2, respectively, on the respective short side 22 are spaced apart by a distance b. Here the two rear protrusions 23.1 in the pressure application direction a each have a first contact point 21.1, and the two front protrusions 23.2 in the pressure application direction a each have a second contact point 21.2. As illustrated in FIG. 5a, under the effect of the circumferential force U shown here in the first circumferential direction u1, the rear protrusion 23.1 on the right-hand short side 22 forms the first contact point 21.1 at which the first ramp piece 15.1 is tilted inward in its tilt position. The second contact point 21.2 is formed by the front protrusion 23.2 on the right-hand short side 22 here, in that the first ramp piece 15.1 in its tilt position on the inside butts up against the first guide channel 18.1. Similarly, under the effect of a circumferential force in the second circumferential direction u2, according to FIG. 4a the right rear protrusion 23.1 forms the first contact point 21.1 and hence the pivot point for the tilt process, and the left front protrusion 23.2 forms the second contact point 21.2 in that the first ramp piece 15.1 on the foot portion side rests on the inside on the first guide channel 18.1. Because of the geometry, distance b must be greater than zero so the first ramp piece 15.1 in the tilt position lies against the rear and front protrusions 23.1, 23.2, respectively, in a defined manner, and not elsewhere in an undefined manner. In order however to achieve the maximum possible reaction force R1, R2 at the rear and front protrusions 23.1, 23.2, respectively, distance b must on the other hand be as small as possible. Via the reaction forces R1, R2, also the friction force $\mu_1 R_1$ and the friction force $\mu_2 R_2$ respectively are determined, which is necessary to guarantee self-inhibition of the first ramp piece 15.1. If therefore, as intended, the friction forces $\mu_1 R_1$, $\mu_2 R_2$ in their sum are greater than the servo force V, slipping of the respective ramp piece 15.1 in the first guide channel 18.1 is suppressed.

For better guidance of the first ramp piece 15.1 on the clutch cover 7, a guide sleeve 24 is established thereon with the first guide channel 18.1.

In accordance with the provisions of the patent statutes, the preferred embodiment has been described. However, it should be noted that the alternate embodiments can be practiced otherwise than as specifically illustrated and described.

The invention claimed is:

1. A clutch, comprising
a first clutch part connected to a drive shaft;
a second clutch part connected to an output shaft;
a pressure element arranged to engage the first and second clutch parts, wherein a reinforcement mechanism is provided in a force flow zone between the pressure element and the second clutch part, wherein the mechanism includes first and second ramps to transmit a biasing force for pressing the pressure element against the first clutch part, wherein the first and second ramps contact to form a first ramp pair wherein a circumferential direction component of the first and second ramps of the first ramp pair points in a first circumferential direction, and third and fourth ramps are pressed against each other to form a second ramp pair wherein a circumferential direction component of the third and fourth ramps of the second ramp pair points in a second circumferential direction opposite the first circumferential direction, and wherein the first and second ramps are arranged pressing against each other and the third and fourth ramps are pressing against each other such that the first and second ramps and the third and fourth ramps, respectively, remain in surface contact when a direction of torque, transmitted between the first and second clutch parts, changes from the first circumferential direction to the second circumferential direction.

2. The clutch as claimed in claim 1, wherein the first and second ramps are pressed against each other by an axial force, and simultaneously the third and fourth ramps are pressed against each other by the axial force.

3. The clutch as claimed in claim 1, wherein the first and second ramps are pressed against each other creating a surface normal force with an axial direction component which is parallel to the drive and output shafts and the circumferential direction component which is circumferentially around the drive and output shafts.

4. The clutch as claimed in claim 3, wherein:
the reinforcement mechanism further comprises a ramp piece pair including a first ramp piece having the second and fourth ramps and a second ramp piece including the first and third ramps, wherein the first and second ramp pieces lie against each other axially on faces via the first, second, third, and fourth ramps, and the second ramp piece is mounted on the pressure element, and the first ramp piece is mounted essentially rotationally fixed on the first clutch part.

5. The clutch as claimed in claim 4, wherein the first and second ramp pieces of the ramp piece pair are arranged lying against each other axially on the faces of both the first ramp pair and the second ramp pair under all operating conditions.

6. The clutch as claimed in claim 5, wherein:
the first and second ramp pieces lie against each other under spring pre-tension, wherein the first ramp piece is pressed against the second ramp piece by a first spring in a pressure application direction; and
the second ramp piece is pressed against the first ramp piece by a second spring against the pressure application direction.

7. The clutch as claimed in claim 6, wherein the first ramp piece and the second ramp piece each include a head portion and a foot portion, wherein the first ramp piece is guided in a first guide channel on the first clutch part and the second ramp piece is guided in a second guide channel on the pressure element.

8. The clutch as claimed in claim 7, wherein:
the foot portion of the first ramp piece and the foot portion of the second ramp piece are guided axially moveably in the first guide channel and in the second guide channel, respectively, and
a cross section of the first foot portion of the first ramp piece and a cross section of the second foot portion of the second ramp piece have a smaller dimension than the cross section of the first guide channel and a cross section of the second guide channel respectively, which smaller dimension is suitable for self-inhibition of axial displaceability of the foot portions of the first and second ramp pieces by tilting in the first and second guide channels, respectively.

9. The clutch as claimed in claim 8, wherein the first foot portion, at least on a side pointing in the circumferential direction, includes rear and front protrusions which run transverse to the pressure application direction and are arranged axially spaced by a distance and via which the first foot portion, on torque transmission, lies axially friction-resistantly inside the first guide channel.

10. The clutch as claimed in claim 4, wherein the ramp piece pair is one of a plurality of ramp piece pairs which, in relation to the drive and output shafts, are arranged radially on a circumferential circle around the drive and output shafts and evenly spaced from each other circumferentially.

11. The clutch as claimed in claim 6, wherein the second spring exerts a force against the pressure application direction on the pressure element to release the pressure element from the second clutch part.

12. The clutch as claimed in claim 11, wherein:
the first clutch part is a clutch cover which is connectable to, and rotationally fixed with, the drive shaft via a clutch basket or flywheel, and
the second clutch part, the pressure element, the pressure element and reinforcement mechanism are arranged axially between the clutch basket or the flywheel and clutch cover, wherein the second ramp piece is mounted on the pressure element, the second clutch part rests on the pressure element in the pressure application direction, and the second spring rests on the pressure element and on the clutch basket or the flywheel.

13. The clutch as claimed in claim 6, wherein a spring constant of the second spring has a value which is a multiple of the value of a spring constant of the first spring.

14. The clutch as claimed in claim 13, wherein the multiple is between ten and twenty.

15. A clutch comprising:
a first clutch part connected to a drive shaft;
a second clutch part connected to an output shaft;
a pressure element configured to selectively cause the first and second clutch parts to engage;
a first ramp piece essentially rotationally fixed to the first clutch part and having a first ramp oriented in a first circumferential direction and a second ramp oriented in a second circumferential direction for torque transfer in a direction opposite from torque transfer of the first ramp; and a second ramp piece mounted to the pressure element and having a third ramp oriented parallel to the first ramp and a fourth ramp oriented parallel to the second ramp, wherein the first and third ramps and the second and fourth ramps remain in surface contact in both directions of relative torque between the first and second clutch parts under all operating conditions.

16. The clutch of claim 15 including a first spring pressing against the first ramp piece to bias the first ramp piece toward the second ramp piece.

17. The clutch of claim 16 including a second spring pressing against the pressure element, biasing the pressure element against the second ramp piece, which, in turn, is biased against the first ramp piece.

18. A clutch comprising:
a first clutch part connected to a drive shaft and including a first channel guide;
a second clutch part connected to an output shaft;
a pressure element configured to selectively cause the first and second clutch parts to engage and including a second channel guide;
a first ramp piece mounted essentially non-rotatably in the first channel guide of the first clutch part and having a first ramp oriented in a first circumferential direction, a second ramp oriented in a second circumferential direction for torque transfer in a direction opposite from torque transfer of the first ramp, and a first foot axially slidable in the first channel guide while no torque is being transferred between the first and second clutch parts but axially fixed in the first channel guide when friction resistance between the first foot and the first guide channel exceeds a servo force that biases the first ramp piece away from the first clutch part; and a second ramp piece mounted to the pressure element in the second guide channel in the pressure element and having a third ramp oriented the same as the first ramp and a fourth ramp oriented the same as the second ramp, wherein the first and third ramps and the second and fourth ramps remain in surface contact under all operating conditions for torque transmitted between the first and second clutch parts.

19. The clutch of claim 18 wherein the first foot includes a pair of spaced apart, radially extending protrusions located within the first channel guide, wherein the protrusions frictionally engage the first channel guide when torque is applied between the first and second clutch parts.

20. The clutch of claim 18 including a first spring pressing against the first ramp piece to bias the first ramp piece toward the second ramp piece, and a second spring pressing against the pressure element, biasing the pressure element against the second ramp piece, which, in turn, is biased against the first ramp piece.

21. A clutch comprising:
an input connected to a driveshaft;
a pressure element selectively engaging the input to an output;
a first member having a first ramp and a second ramp oriented for torque transfer in an opposite direction from the first ramp;
a second member having third and fourth ramps in surface contact with the first and second ramps, respectively, under all operating conditions;
a spring biasing the first member into the second member.

22. The clutch of claim 21 further including a second spring pressing against the pressure element, biasing the pressure element against the second member, which, in turn, is biased against the first member.

* * * * *